Figure 1:
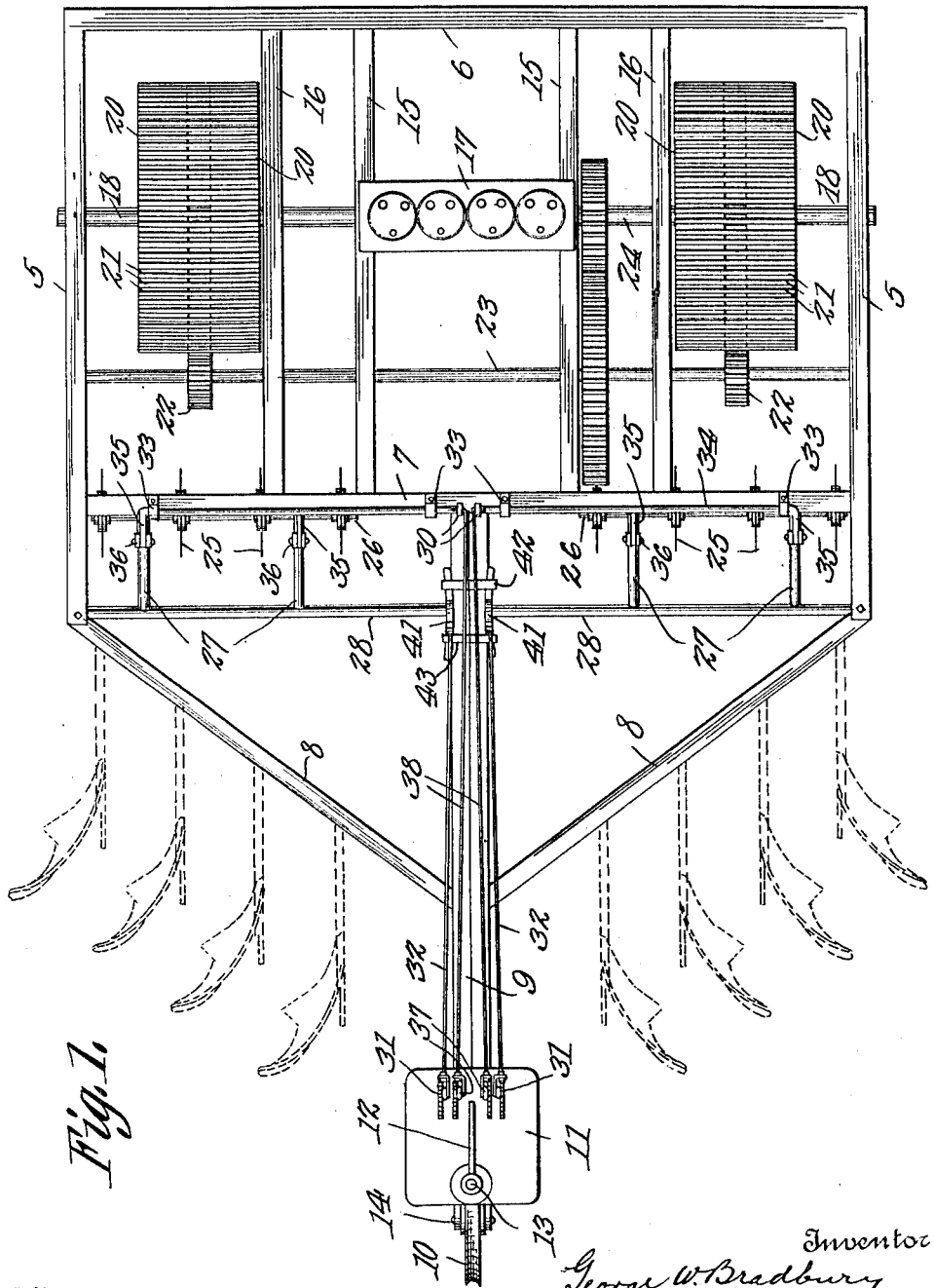

G. W. BRADBURY.
TRACTOR.
APPLICATION FILED OCT. 10, 1913.
1,117,477.
Patented Nov. 17, 1914.
2 SHEETS—SHEET 2.
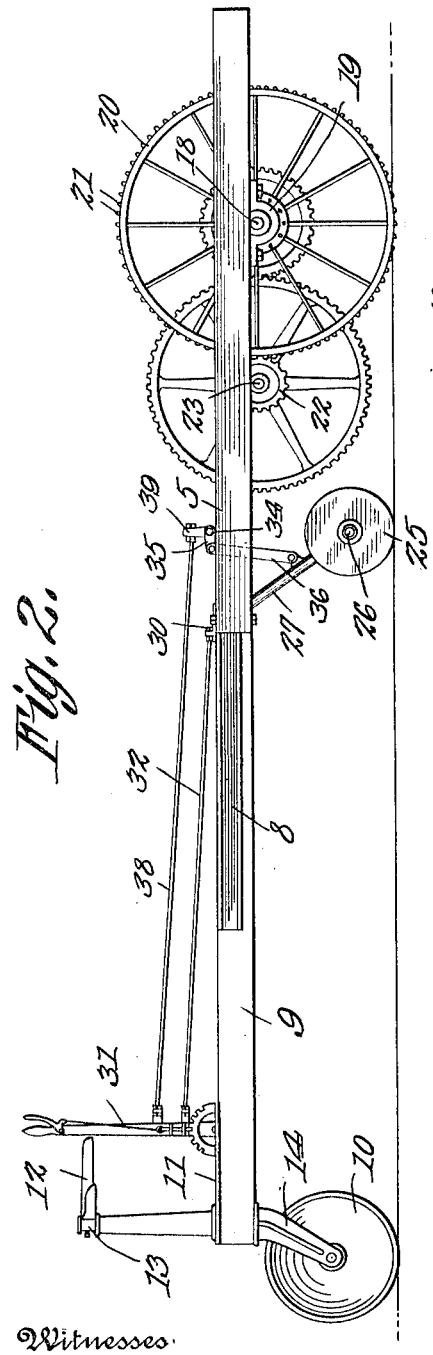
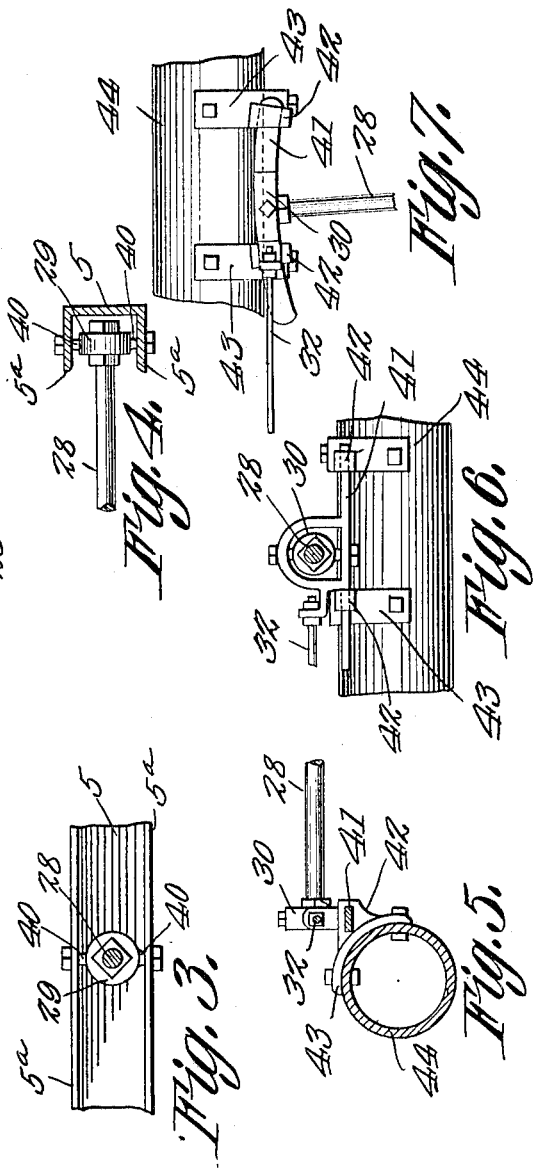
Witnesses
F. B. Wooden.
M. C. Lucas
Inventor
George W. Bradbury
by Max A. Schmidt
Attorney

UNITED STATES PATENT OFFICE.

GEORGE W. BRADBURY, OF WALLA WALLA, WASHINGTON.

TRACTOR.

1,117,477.   Specification of Letters Patent.   Patented Nov. 17, 1914.

Application filed October 10, 1913. Serial No. 794,421.

*To all whom it may concern:*

Be it known that I, GEORGE W. BRADBURY, a citizen of the United States, residing at Walla Walla, in the county of Walla Walla and State of Washington, have invented certain new and useful Improvements in Tractors, of which the following is a specification.

This invention relates to tractors which are designed more particularly for hauling agricultural machinery, such as plows, cultivators, harvesters, etc., and the object of the invention is to provide a novel and improved drive gear, and also to provide the tractor with means for holding it in position on a side hill to prevent it from sliding down the hill.

These objects are attained by means of a combination and arrangement of parts to be hereinafter described and claimed, reference being had to the accompanying drawing in which—

Figure 1 is a plan view of the tractor; Fig. 2 is a side elevation thereof; Fig. 3 is a front elevation of one of the bearings hereinafter described, and Fig. 4 is a side elevation thereof; Fig. 5 is a side elevation of another bearing, and Figs. 6 and 7 are a front elevation and a plan view thereof.

Referring specifically to the drawing, the frame of the tractor comprises spaced side bars 5 connected in front by a cross-bar 7. From the rear ends of the side bars extend converging beams 8 which meet a tongue S extending rearward from the center of the cross-bar 7. The rear end of the tongue is mounted on a steering wheel 10 and carries a platform 11, on which latter the steersman stands, astride a paddle 12 extending from the stem 13 of a fork 14 which supports the steering wheel.

The cross-bars 6 and 7 are connected by spaced parallel bars 15 and 16, one pair of such bars being located on each side of the frame. The bars 15 support the engine 17, which latter may be, and preferably is, an internal-combustion engine.

The frame herein described is mounted on a pair of traction wheels, the axles 18 of which are supported in bearings 19 carried by the bars 5 and 16. Each traction wheel is made up of two wheels 20 which are connected in laterally spaced relation by cross-bars 21 extending transversely across the peripheries of the rims of said wheels and made fast thereto. The bars 21 extend in a circular series around the rims of the two wheels 20, and they are uniformly spaced apart and pass across the space between said wheels. The purpose of the bars 21 is to serve as traction spurs to prevent slippage of the wheels, and also to serve as gear teeth, a drive pinion 22 engaging the same between the two wheels. The bars 21 therefore serve a double purpose, and as the driving force is applied at the periphery of the wheels, a maximum leverage is obtained. Both traction wheels are constructed and driven as herein described. The pinions 22 are on a shaft 23 geared up to the engine shaft 24.

In order that the tractor may be successfully employed on side hills, the following means is provided for preventing the same from slipping or sliding down the hill: A series of spaced disks 25, extending transversely of the tractor, are mounted on a horizontal shaft 26, which is supported by arms 27 extending downward from a horizontal shaft 28 which is supported at its outer end in a bearing 29 at the rear end of the side bar 5. The inner end of the shaft 28 is supported in a bearing 30 which is slidably mounted on the tongue 9. The outer end of the shaft 28 is loose in the bearing 29 and its inner end is loose in the bearing 30. Thus the shaft 28 is free to be swung in a horizontal plane and positioned to extend obliquely to the line of draft. On the platform 11 is a hand-lever 31 which is connected by a rod 32 with the bearing 30, whereby the latter is slid back and forth to adjust the angular position of the shaft 28. The shaft 26 follows the shaft 28 and the disks 25 may therefore be set at an oblique angle to the line of travel of the tractor.

The cross-bar 7 carries bearings 33 which support a rock-shaft 34 having arms 35 loosely connected by links 36 to the arms 27, whereby the disks 25 may be elevated or lowered. The rock-shaft is operated by a hand-lever 37 mounted on the platform 11 and connected by a rod 38 to a rocker arm 39 on said shaft. The disks may thus be readily elevated above the ground or lowered into operative position. The disks are sharp so that they cut into the ground when they are lowered. A set of disks and operating means as herein described is provided for each side of the machine, said sets being independently adjustable and operable.

If the tractor is employed for plowing, the plows will be mounted on the beams 8 as shown by dotted lines in Fig. 1. Now, if plowing on a side-hill, with the right-hand plows in the ground, the set of disks 25 ahead of the same, on the same side, will be elevated, and the set of disks 25 on the left-hand side will be lowered to cut into the ground. The left-hand set of disks will be adjusted to extend at an oblique angle to the line of travel of the tractor and pointing up-hill. With the disks in this position, they are continually trying to roll away from the general line of travel, and they thus tend to draw the tractor back against its tendency to slip down hill. When the end of the furrow is reached the tractor is turned around, and the plows and disks are reversed, so that the tractor may now proceed parallel with the last furrow, in view of which it is not necessary to go around the hill and climb a ridge to get over to the other side. The disks also break the ground before the plows, similar to a colter. If the tractor is employed for operating a harvester, the latter will be connected to the tractor in front thereof.

The bearings 29 of the shafts 28 are vertically swiveled to the side bars 5, the latter being channel beams which are set so that their flanges 5ª are at the top and bottom and point inward. The bearings 29 have top and bottom pivot stems 40 which are pivoted to the flanges 5ª. The bearings 30 for the inner ends of the shafts 28 are vertically swiveled in slides 41 mounted in guides 42 on brackets 43 carried by the tubular rear end sections 44 of the tongue 9.

I claim:

1. A tractor comprising a frame, traction-wheels on which the frame is mounted, a steering element, and a series of ground-engaging disks carried by the frame and adjustable to extend obliquely to the line of travel of the tractor when in operative position.

2. A tractor comprising a frame, traction-wheels on which the frame is mounted a steering element, a series of ground-engaging disks carried by the frame and adjustable to extend obliquely to the line of travel of the tractor when in operative position, and means for raising and lowering the disks.

3. A tractor comprising a frame, traction-wheels on which the frame is mounted a steering element, and a series of ground-engaging disks carried by the frame on each side thereof, the series of disks on the respective sides of the machine being independently adjustable to extend obliquely to the line of travel of the tractor when in operative position.

4. A tractor comprising a frame, traction-wheels on which the frame is mounted, a horizontal shaft carried by the frame, means for swinging the shaft to extend obliquely to the line of travel of the tractor, arms extending from the shaft, a shaft carried by the arms, disks carried by the last-mentioned shaft, and raising and lowering means for the disks.

5. A tractor comprising a frame, traction-wheels on which the frame is mounted, a horizontal shaft carried by the frame, means for swinging the shaft to extend obliquely to the line of travel of the tractor, arms extending from the shaft, a shaft carried by the arms, disks carried by the last-mentioned shaft, a rock-shaft carried by the frame, a loose connection between the rock-shaft and the aforesaid arms, and means for operating the rock-shaft.

In testimony whereof I affix my signature in presence of two witnesses.

GEORGE W. BRADBURY.

Witnesses:
W. A. TONER,
E. E. SANGE.

Copies of this patent may be obtained for five cents each, by addressing the "Commissioner of Patents, Washington, D. C."